US008043543B2

(12) United States Patent
Wang et al.

(10) Patent No.: US 8,043,543 B2
(45) Date of Patent: Oct. 25, 2011

(54) METHOD FOR MOLDING OF POLYMER COMPOSITES COMPRISING THREE-DIMENSIONAL CARBON REINFORCEMENT USING A DURABLE TOOL

(75) Inventors: Chen-Shih Wang, Troy, MI (US); Yar-Ming Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 473 days.

(21) Appl. No.: 11/692,412

(22) Filed: Mar. 28, 2007

(65) Prior Publication Data

US 2008/0241296 A1    Oct. 2, 2008

(51) Int. Cl.
*B29C 43/04*    (2006.01)
*B29C 43/18*    (2006.01)

(52) U.S. Cl. ......... 264/257; 264/258; 264/337; 264/338

(58) Field of Classification Search .................. 264/257, 264/258, 294, 337, 338
See application file for complete search history.

(56) References Cited

U.S. PATENT DOCUMENTS

| | | | | |
|---|---|---|---|---|
| 5,062,786 A | * | 11/1991 | Arai | 425/174 |
| 5,204,042 A | * | 4/1993 | James et al. | 264/257 |
| 5,268,225 A | * | 12/1993 | Isayev | 428/300.7 |
| 5,489,410 A | * | 2/1996 | Baumgartner et al. | 264/219 |
| 5,578,255 A | * | 11/1996 | Okuyama et al. | 264/29.5 |
| 5,817,267 A | * | 10/1998 | Covino et al. | 264/219 |

FOREIGN PATENT DOCUMENTS

EP        0765734        4/1997

* cited by examiner

*Primary Examiner* — Yogendra Gupta
*Assistant Examiner* — Joseph Leyson
(74) *Attorney, Agent, or Firm* — Reising Ethington P.C.

(57) ABSTRACT

A method is disclosed for high volume production of molded dimensionally accurate polymer composite articles comprising three-dimensional carbon fiber reinforcement in high volume. Carbon fiber cloth infiltrated with a liquid thermosetting polymer precursor is shaped by application of pressure to urge the cloth against the surface of a mold and then heated while under pressure to cure the polymer precursor into a solid polymeric matrix for the carbon fiber article. Mold tooling is formed of suitable iron-nickel alloys and provided with a hard electroless nickel coating on the mold cavity surface. The iron and nickel alloy provides thermal expansion properties generally matched to those of the articles for the molding of dimensionally accurate parts. The nickel alloy coating provides a durable surface to resist abrasion by the carbon fiber cloth without adversely affecting the expansion properties of the mold, and remains adherent to the base metal during the repeated thermal cycling encountered in high volume production.

10 Claims, 2 Drawing Sheets

METHOD FOR MOLDING OF POLYMER COMPOSITES COMPRISING THREE-DIMENSIONAL CARBON REINFORCEMENT USING A DURABLE TOOL

TECHNICAL FIELD

This invention pertains to the molding of a succession of many like carbon fiber reinforced polymer parts such as in the production of light weight automotive vehicle body panels. More specifically, this invention pertains to the preparation and use of durable tooling for such repetitive molding operations on abrasive materials.

BACKGROUND OF THE INVENTION

Carbon fiber composite parts comprise carbon fiber cloth impregnated with a matrix polymer such as a suitable epoxy resin composition. While epoxy resins are commonly used matrix polymers, other polymers such as polyester resins, vinyl ester resins, polypropylene resins, or polyamide resins are also suitable. In low volume production of a given part, a thermosetting composite article is usually produced by layering sheets of carbon fiber cloth onto a mold cavity surface that defines the shape of the desired product. The alignment and weave of the carbon fibers in the cloth may be important in the mechanical performance of the resulting product. The layered sheets of carbon fiber cloth are carefully infiltrated and impregnated with uncured liquid polymer material. The liquid material is carefully flowed around each fiber or strand of the cloth to form a fiber and liquid composite with minimal air or gas voids. The liquid is uncured precursor material for the thermosetting polymeric material that will constitute a solid matrix around each fiber of the carbon cloth or other fibrous carbon reinforcing material. Impregnation with the liquid polymer precursor may be accomplished before or after the layered sheets are placed in the mold. There the layers are compacted into a desired shape and the liquid polymeric precursor matrix is heated and cured to a solid matrix. The cured polymer-carbon fiber composite product is light in weight and very strong.

For low volume production liquid polymer precursor (sometimes called "resin") impregnated carbon cloth sheets (called "prepreg") may be laid up by hand on a single-sided tool. Prepreg sheets about 0.2 mm thick and comprising, for example, 40 weight percent liquid epoxy resin precursor and 60 weight percent of a single layer of carbon cloth are cut to a desired shape and laid up in multiple layers on a mold surface to obtain a part shape. The assembly is then placed in a vacuum and compressed and heated to promote resin flow to eliminate voids in the molding. Heating at a suitable temperature cures the epoxy resin (or other resin material) to form a strong carbon composite product characterized by reinforcing layers of carbon fiber cloth in a polymer matrix. This composite is very strong and its constituents are of relatively low specific gravity. Compared to other candidate materials of construction, carbon fiber composites provide a unique combination of stiffness and low weight.

High value carbon fiber composite parts are used, for example, in aerospace applications, high performance sail boats and bicycles, and in racing vehicles or unique lightweight super cars. These "high value" applications permit the use of high labor cost, hand lay-up molding practices. And the low production volumes permit the use of molding tool materials that do not provide hard surfaces for resisting wear from the abrasive composite materials. The high volume production, for example, of automobile body panels requires molding tools in which many identical panels may be successively formed to high dimensional accuracy.

Invar tooling has been used for molding precision carbon fiber composite panels with complex geometry in both aircraft and automotive industries. The alloy, Invar-36, consists, by weight, of 36% nickel and 64% iron. It became the preferred tooling material because of its unique thermal expansion behavior: a coefficient of linear thermal expansion (CLTE) of $2 \times 10^{-6}$ per ° C. in the temperature range of 25° C.-150° C., very close to that of the carbon fiber composites. The tooling material is considered to be too soft for production of a large number of composite parts. The hardness of Invar-36 (80 HRB) is significantly lower than that of the P20 tool steel (50 HRC), suggesting that Invar tooling will not be sufficiently wear-durable by automotive standards even for low volume production.

It is an object of this invention to provide a suitable tool material for molding liquid polymer precursor infiltrated, carbon fiber composite parts in high volumes where the tool surface is continually and repeatedly exposed to abrasive contact with the composite material. An example of such a manufacturing situation is the molding of automotive body panels at automotive production volumes.

SUMMARY OF THE INVENTION

It is found that Invar-36 type tooling may be made more durable for high volume production of carbon cloth (or other fiber structures) reinforced polymer matrix parts without adversely affecting its desirable thermal expansion properties in relation to the thermal expansion properties of the molded composite material. In other words, this invention retains the dimensional accuracy of the Invar-36 type mold material while providing a hard, wear resistant surface. Carbon fiber-containing composite parts with good dimensional accuracy may be repetitively made in large volume production using the improved tooling.

In accordance with this invention, a single mold tool or a set of complementary mold tools are fabricated from slabs, sheets or other shape of the Invar-36 nickel-iron composition or a like nickel alloyed, iron based composition having generally equivalent thermal expansion properties for molding carbon fiber composite articles. The mold cavity surfaces are machined slightly oversized and the article shaping surfaces are then provided with a uniform layer of electroless nickel. The electroless nickel coating on the tool surface(s) is suitably formed by an autocatalytic chemical reduction of nickel ions in aqueous solution using a phosphorous-containing or boron-containing catalyst. In general, a phosphorus-containing catalyst, such as hypophosphite ions, is preferred because of the hardness of the resulting nickel-phosphorus deposit. The thickness of the coating is suitably, for example, about 60-90 micrometers.

It is found that the electroless nickel plated nickel-iron alloy (e.g., Invar-36) has a suitably durable surface for the repetitive molding of many carbon fiber composite parts to high dimensional accuracy. Moreover, the electroless deposited nickel layer retains a smooth molding surface and remains adherent to the ferrous alloy substrate after hundreds of laboratory accelerated thermal cycles as experienced in repetitive loading of composite materials, heat curing of the composite materials, and unloading of the cured composite product.

The use of the electroless nickel coated, nickel-iron tooling of this invention is applicable to the many various molding practices for the forming of carbon fiber composite parts. The hard surface provides abrasion resistance against the composite materials. The adherent coating and underlying substrate cooperate to retain good dimensional properties for the repetitive molding of substantially identical parts as required in the automotive and other industries.

The tooling is useful in the conduct of liquid molding processes for the composite parts such as resin transfer molding and reaction injection molding in which a preform of the reinforcing cloth is placed between complementary tools. The tools are closed and liquid resin is injected into the cavity to infiltrate the reinforcing cloth, and the tools are heated to cure the resin impregnated carbon fiber composite. The tooling is also useful in compression molding of carbon fiber epoxy prepregs, carbon fibers containing vinyl ester resins, and various carbon fiber reinforced thermoplastic polymers. And the nickel coated tooling is useful in hand lay-up carbon fiber composite laminate moldings that are autoclave cured.

Other objects and advantages of the invention will be apparent from a description of illustrative preferred embodiments which follows.

DESCRIPTION OF PREFERRED EMBODIMENTS

Figure 1:
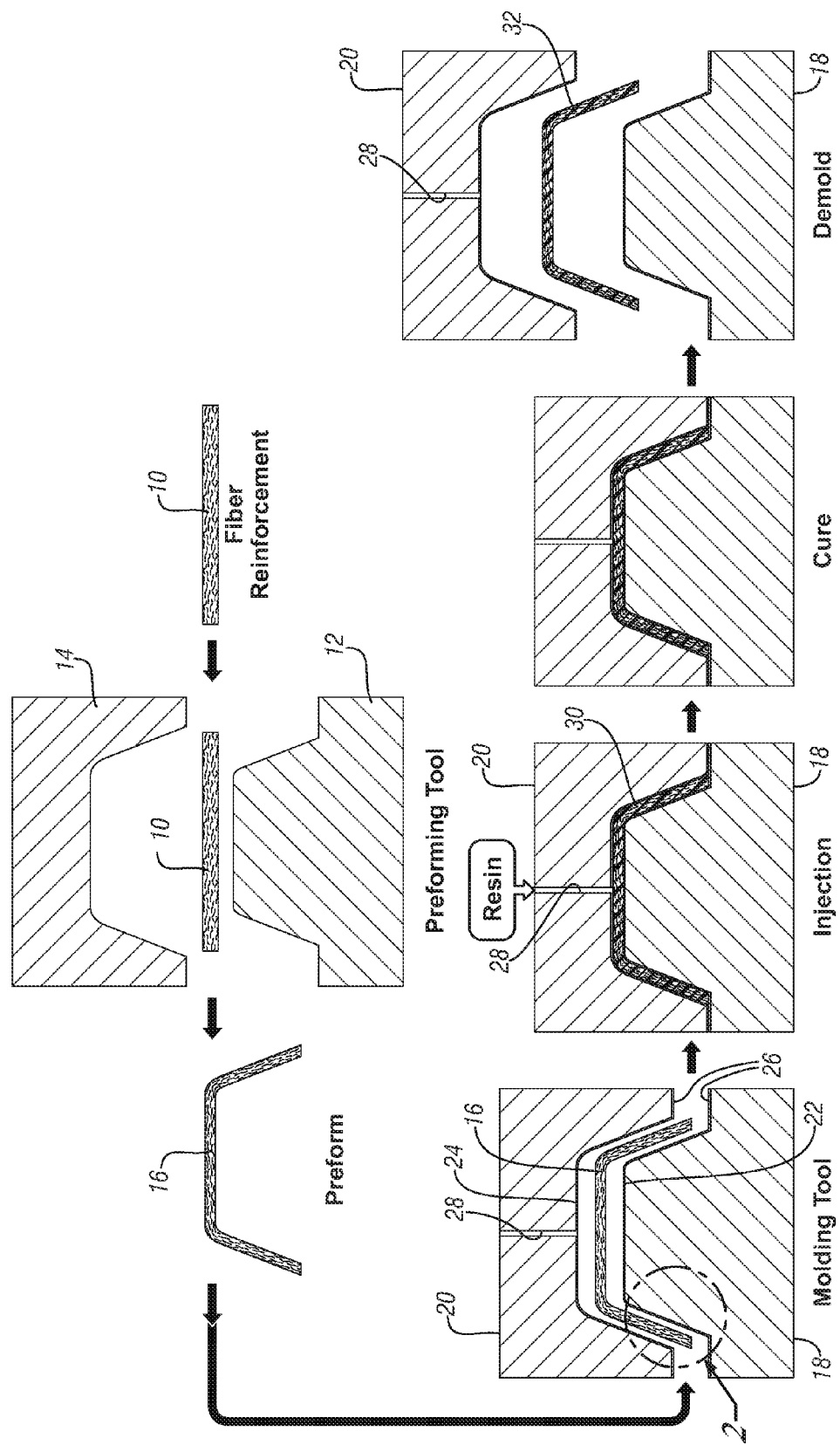
FIG. 1 is a schematic flow diagram of a resin transfer molding process for producing carbon cloth or carbon fiber containing composites using nickel-coated tools in accordance with this invention.

In accordance with this invention, Inver-36 alloy specimens have been plated with a thin layer of hard electroless nickel for evaluation and use as automotive production tooling. The surface layer as deposited comprised an alloy of nickel and phosphorus because the reduction catalyst for the deposition was a hypophosphite salt. The evaluation focused on examining the thermal cycling stability of the nickel alloy coatings since composite molding tools are constantly subjected to heating and cooling cycles during their service life and the mismatched CLTE between the nickel coatings (about $13 \times 10^{-6}$ per $^\circ$ C.) and the Invar substrates could cause significant stress in the coatings. The study was carried out by monitoring the hardness, roughness, and morphological changes of the coating surface and the coating/substrate interface at various predetermined heating and cooling cycles.

Preparation of Samples and Testing

Four Invar-36 plaques (152 mm×102 mm×9.5 mm) supplied by Re-Steel (Eddystone, Pa.) were used in this study. Before plating, the surfaces of the plaques were polished or polished and textured: two plaques were polished to 600 grit finish and then textured by blasting with a mixture of aluminum oxide and glass bead such as for a panel outer surface, and the other two were polished to 400 grit without texturing for a panel inner surface.

The polished plaques were plated with two proprietary commercial electroless nickel coatings: TM103 and E-Krome by Techmetals, Inc. of Dayton, Ohio. Electroless nickel coating processes generally employ sodium hypophosphite as a reducing agent; consequently, the deposits produced are nickel-phosphorus alloys rather than pure nickel. This allows the composition to be varied (normally between about 2 wt % and about 13 wt % phosphorus) thereby providing a range of useful properties, including extreme hardness, good resistance to corrosion, and attractive appearance. A comparison of the supplier's specifications of these two coatings is shown in Table I. The E-Krome coating had lower phosphorus content, a higher melting temperature, and was harder than the TM103 coating. However, the salt spray corrosion performance of the E-Krome coating was not as good as the TM103 coating, possibly due to the lower phosphorous content.

TABLE I

Properties comparison between TM103 and E. Krome coatings

| Properties | TM103 | E. Krome |
|---|---|---|
| Phosphorus content (wt. %) | 10.5-13.0 | 4.0-7.0 |
| Melting point ($^\circ$ C.) | 880 (eutectic) | 960-1205 |
| Hardness (HRC) | 45-50 | 60-64 |
| Corrosion resistance (ASTM-B117) | 1000 hrs | 300 hrs |

The nickel alloy plated Invar plaques were subjected to laboratory accelerated thermal cycling according to the following procedure of heating and cooling. The plaques were heated for 1 hour in a 177$^\circ$ C. hot air oven, removed from the oven and allowed to cool at room temperature for one-half hour. This cycle was repeated 7 times a day until a desired total number of cycles were completed. This laboratory thermal cycling procedure is patterned after molding cycles used in low volume production (by automotive industry standards) of Corvette® carbon fiber composite hoods.

The stability of the nickel coatings was investigated by monitoring the hardness, roughness, and surface and interface morphologies of the plated plaques during the thermal cycling test. The micro-hardness was measured using Matsuzawa MXT70 with a Knoop Indenter. The hardness value was then converted to the Rockwell scale using ASTM E140-05 for comparison with conventional tooling materials. The surface roughness of the coatings was measured using a Wyko 3-D Profilometer. The surface morphology of the plated samples was examined using a Zeiss Evo 50 scanning electron microscope (SEM). An elemental detector (EDS) attached to the SEM was used to examine the approximate compositions of the coatings. For monitoring the interface morphology, cross-sections of each sample were mounted in Lucite and polished to a mirror finish.

Results and Discussion

Surface Hardness

As mentioned earlier, Invar-36 alloy has a HRB hardness of 80, significantly softer than the conventional P20 steel often used for automotive molding tools. The measured HRC hardness values of the four electroless nickel plated Invar plaques, both as plated and thermal cycled, are shown below in Table 2 as a function of thermal cycles. The grit numbers, 400 and 600, refer to the grit polishing of the Invar substrate prior to the deposition of the electroless nickel alloys.

TABLE 2

| | Thermal Cycles | | | |
|---|---|---|---|---|
| | 0 | 100 | 200 | 300 |
| TM 103, 400 | 40 HRC | 36 HRC | 36 HRC | 36 HRC |
| TM 103, 600 | 35 HRC | 40 HRC | 40 HRC | 40 HRC |
| E-Krome, 400 | 45 HRC | 50 HRC | 50 HRC | 50 HRC |

TABLE 2-continued

| | Thermal Cycles | | | |
|---|---|---|---|---|
| | 0 | 100 | 200 | 300 |
| E-Krome, 600 | 50 HRC | 52 HRC | 50 HRC | 52 HRC |

The data indicate that both TM103 and E-Krome electroless nickel coatings successfully hardened the Invar substrates; although the resulting hardness values are approximately 15%-25% lower than those given in the coating specifications shown in Table I. The as-plated HRC hardness values of the two E-Krome coatings are higher than that of the TM103 coatings and are comparable to the hardness of P20 tool steel, 50 HRC. The TM103 coatings failed to meet the target hardness value. Consequently, they are significantly less preferable as a surface material for tools for significant production of carbon fiber composite parts.

Table 2 also shows that the hardness values of both TM103 and E-Krome nickel coatings were not much affected by the heating and cooling cycles. The hardness of E-Krome 400 showed a minor increase at the very beginning of the test and leveled off after 100 thermal cycles. The results suggest that the hardness of the coatings will be stable in the operating temperature range of the molding tools. Additionally, the initial surface finish of the Invar substrates, 400 grits and 600 grits, did not have any influence on the hardness of the electroless nickel coatings before and after the thermal cycling.

Surface Roughness

The arithmetic mean roughness values, Ra, of the nickel coated Invar plaques indicate that the as plated E-Krome coatings had a smoother surface than the as-plated TM103, 0.7 μm versus 1.3 μm, respectively. The surface roughness values of both coatings were not affected by the thermal cycling tests, suggesting again that the coatings will be stable in the operating temperature range of the molding tools. Similar to the hardness data, the surface roughness of the coated samples was not much influenced by the initial surface finish of the Invar substrates. The difference in roughness of TM103 and E-Krome samples apparently is a result of the coating characteristics, at least when the substrates are reasonably finished as those used in the study.

Coating-Substrate Interface

To examine the interface between electroless nickel coatings and Inver substrates, optical micrographs were taken from the cross-sections of coated samples, both as plated and thermal cycled. For all the samples examined, the micrographs revealed no signs of delamination at the coating-substrate interfaces after 300 cycles of accelerated heating and cooling. The result provides strong evidence that the electroless nickel coatings will be stable for use as composite molding tools, consistent with previous suggestions made based on hardness and roughness data.

Furthermore, the cross-sectional optical micrographs showed that the average coating thickness is about 75 μm (3 mils) for both TM103 and E-Krome plated samples. This coating thickness is effective to dampen or remove any substrate influence to the coating properties as seen by the insensitivity of the hardness and surface roughness data with respect to the initial surface condition of the substrates. The absence of change in coating thickness during thermal cycling is also consistent with the finding that the electroless nickel coatings on Inver substrates are stable.

SEM Analysis of E-Krome Coatings

The above hardness and stability studies have clearly identified that the E-Krome plated Invar-36 alloy is a feasible tooling material for automotive composite molding applications. The E-Krome coatings, both as plated and thermal cycled, were therefore further characterized using SEM analysis to determine their elemental compositions and surface morphologies as described in the following.

The results of the SEM-EDS analysis of the elemental compositions of the E-Krome 600 coatings before and after the heating and cooling cycles are shown in Table 3. The phosphorus contents of the coating samples are in the range of 6-7 wt % and remain practically constant throughout the thermal cycling test The elemental composition of the as plated E-Krome 600 coating, 7.6 wt % phosphorus and 92.4 wt % nickel, is consistent with the coating specification given in Table 1.

TABLE 3

Elemental compositions of the E-Krome 600 coatings as plated and thermal cycled

| Composition | 0 cycles | 100 cycles | 200 cycles | 300 cycles |
|---|---|---|---|---|
| Phosphorus (wt. %) | 7.6 | 6.6 | 6.5 | 6.3 |
| Nickel (wt. %) | 92.4 | 93.4 | 93.5 | 93.7 |

The results of the SEM surface microscopy revealed no noticeable surface morphological changes for the nickel plated samples before and after thermal cycling. The alloys containing lower phosphorus content were characterized by the presence of crystalline and microcrystalline nickel, which indicates that the number of phosphorus atoms is not sufficient to distort the nickel lattice to an extent where amorphous nickel can be obtained. The nodular structure of nickel-phosphorus deposits decreases with increasing phosphorus content. The structure of the E-Krome coatings remained the same during the cycling test.

Electroless nickel plated Invar tooling is suitable for high volume production of carbon fiber polymer composite parts made by molding and curing of the materials. Following are examples of molding practices for such parts.

EXAMPLE 1

Autoclave Cured, Hand Lay-Up, Carbon Fiber Composite Laminate Molding

This process is currently being used to make automotive vehicle body panels in very low volume. Substantially unidirectional carbon cloths sheets (about 0.2 mm thick) impregnated with a liquid epoxy resin precursor composition (40% by weight of the composite) are cut into predetermined patterns. The sheets are laid-up as plies on the cavity surface of a single Invar-36 tool. For example, six plies are laid-up to a total thickness of about 1.2 mm, with successive layers of carbon fibers oriented in different directions to obtain suitably isotropic properties in a molded panel. The laid-up sheet body is covered with a plastic film and sealed around its perimeter for removal of air by vacuum. The entire assembly is loaded into an autoclave for compression against the tool surface and heating to cure the epoxy resin matrix. The tool and cured composite material are removed from the autoclave and cooled, and the film is stripped from the formed panel.

The tool is subject to wear by the abrasive carbon-filled polymer composition during the lay-up process in which hand and hand tools are used to push and force the carbon sheets to conform to the tool surface. The tool is also subject to wear during compression and de-molding. In addition, material builds up on the tool surface and the tool is periodically cleaned using a solvent wash of the mold surface and/or by mechanical blasting of the surface using a relatively soft particle mix.

The process is quite slow. But in the case of, for example, the automotive industry, the process could produce about 2,000 parts a year per tool with three shift operation and durable tooling. For a typical 5-year car program, the tool will need to produce 10,000 parts. The nickel coated tooling of this invention will provide the durability for such production requirements.

EXAMPLE 2

Liquid Molding Process—Resin Transfer Molding (RTM) and Reaction Injection Molding (RIM)

Liquid molding is capable of producing carbon fiber composites up to 100,000 parts per year per tool, depending on the resin chemistry used in the process. There are various forms of liquid molding process and the most widely used are RTM and RIM. The process is illustrated with reference to the schematic flow diagram of FIG. 1.

Referring to FIG. 1, a sheet-like or slab-like multi-layer body 10 (also identified as Fiber Reinforcement in FIG. 1) of carbon fiber cloth is placed between opposing and complementary preforming tools consisting of a lower (as illustrated in the drawing figure) male preforming tool 12 and an upper female preforming tool 14. The set of tools 12, 14 is also identified as Preforming Tool in the drawing figure. At the stage of illustration in FIG. 1, the tools 12 and 14 are vertically separated in their open position and the body 10 of carbon fiber cloth may be laid on lower tool 12. The tools are then closed to impart, under pressure, a preform shape 16 to the original body of reinforcing carbon fibers. This preform shape 16 (also labeled as Preform in the molding process flow sequence of FIG. 1) is illustrated after removal from tools 12, 14. This preforming of the reinforcing material is optional, depending on the complexity of the shape of the article to be formed, and is usually conducted at a slightly elevated temperature at the manufacturing location. The tools 12, 14 are opened and the preform shape 16 removed for the liquid polymer molding step.

The preforming tools 12, 14 shown in FIG. 1 can be made of the durable tooling of this invention if the dimensional accuracy of the preform is critical to the quality of the final part.

Figure 2:
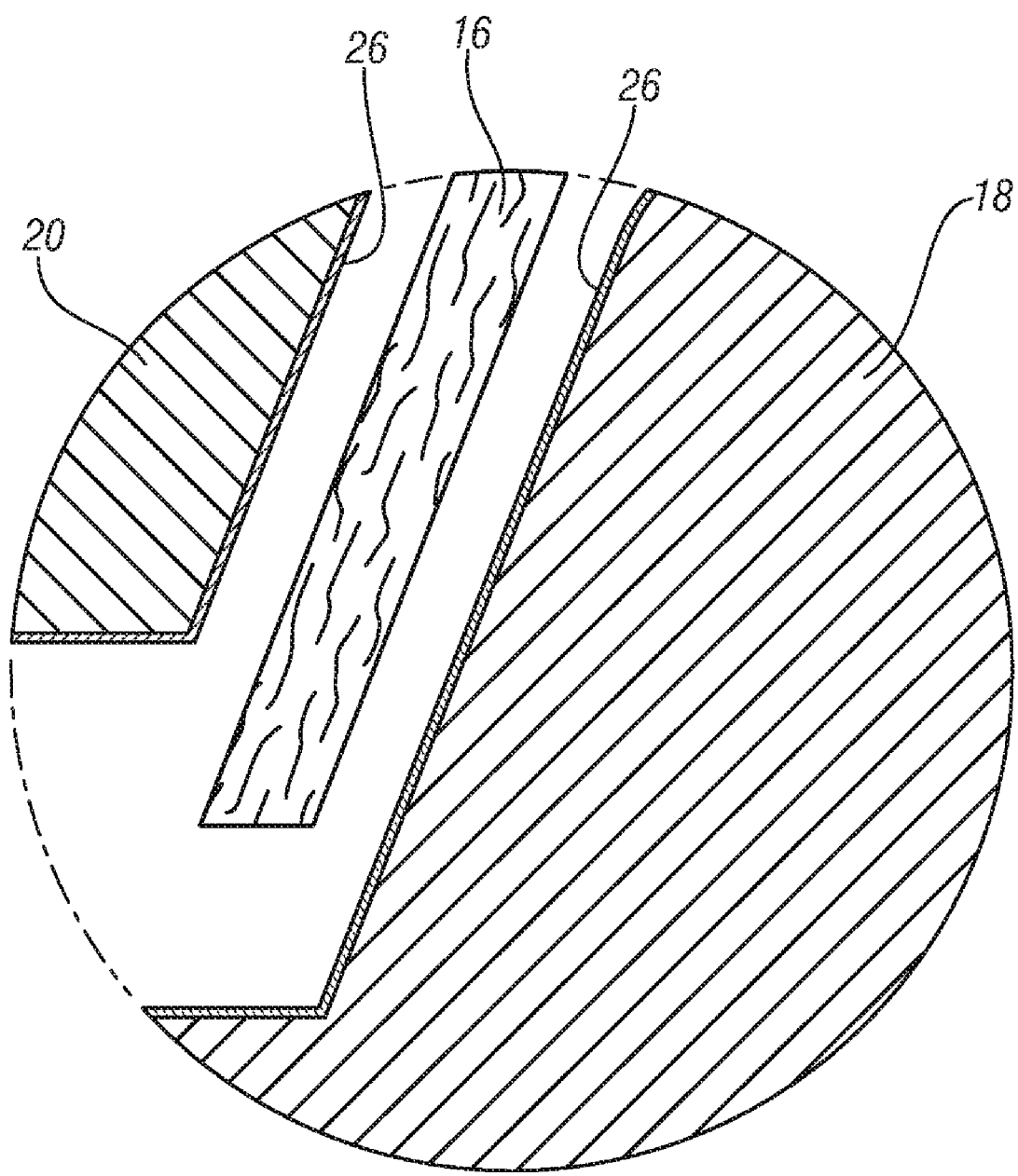
FIG. 2 is an enlarged view of a section of the molding tool shown in FIG. 1 showing its electroless nickel coating layer on an Invar-36 substrate.

The preform shape 16 of multilayer carbon fiber cloth is then placed between a set opposing and complementary carbon composite molding tools comprising lower male molding tool 18 and upper female molding tool 20. The set of molding tools 18, 20 is labeled as Molding Tool in FIG. 1. Molding tools 18 and 20 are formed of a nickel-iron alloy (suitably Invar-36) with a suitably durable layer of electroless nickel alloy 26 on their respective mold cavity defining surfaces 22, 24. FIG. 2 is an enlarged schematic view of a portion of the mold tool 18 cavity surfaces 22 showing the layer 26 of electroless nickel alloy. The nickel alloy layer 26 is suitably applied to a uniform thickness of about seventy micrometers and comprises, by weight, about five to about seven percent phosphorus.

Molding tools 18, 20 are closed on preform shape 16 which is confined between cavity defining surfaces 22, 24. The defined cavity including the carbon fiber preform 16 reinforcing material are commonly evacuated of trapped air through an air-venting passage, not shown, in one of molding tools 18, 20. A liquid two-part epoxy resin precursor composition is pumped into the mold cavity (as indicated in the Injection step of FIG. 1) through a suitable resin charging conduit 28, infiltrating and filling voids in the carbon cloth reinforcing material preform shape 16. Thus, a liquid resin-filled carbon fiber composite 30 is created with in the cavity defined by the closed molding tools 18, 20. The liquid and carbon fiber composite is compressed against the nickel alloy coating layers 26 on cavity surfaces 22, 24 of tools 18, 20. At this stage of the molding process the liquid resin portion of composite 30 is uncured.

The molding tools are heated, such as with internal electrical resistance heating elements (not illustrated) or, simply, hot fluid, to cure the void-free injected resin material and form the solid matrix phase of the carbon cloth-reinforced molded part 32. This is illustrated at the Cure stage of FIG. 1.

The molding tools 18, 20 are opened, as illustrated in the Demold stage of FIG. 1, and the molded product 32 is removed from the molding surfaces of the tools.

EXAMPLE 3

Compression Molding

Compression molding is the most traditional process to produce both thermosetting and thermoplastic composite parts. Ni plated Invar tools can be used to mold carbon fiber composite parts for certain applications such as automotive inner parts. The materials suitable for this type of molding are carbon fiber epoxy prepregs (same as the materials used for autoclave molding), carbon fiber sheet molding compound, SMC (chopped carbon fibers in vinyl ester resin, for example), and various carbon fiber containing thermoplastic polymers such as polypropylene, polyamide, etc. The layers or bodies of prepreg material or SMC are loaded into the cavity of the opened, opposing complementary molding tools. The tools are closed to compress the uncured resin impregnated carbon fiber body in the cavity formed between them. Again, the tools are heated to cure the matrix resin material and then opened for removal of the hot molded part. For thermoplastic molding, the tools are closed to compress the hot resin coated fiber mats to produce shaped final parts A common feature of each of the above described molding processes (and others) is that abrasive carbon fiber reinforcing material is repeatedly brought into compressive and frictional sliding contact with the electroless nickel alloy coated nickel-iron alloy molding tool. The nickel alloy surface is durable despite such repeated abrasive contact and the repeated thermal cycling inherent in the oft-repeated molding cycles required for high volume production of such parts. Moreover, the coated mold tool retains its desirable thermal expansion compatibility with the molding compositions to obtain dimensional accuracy in the molded carbon fiber composite parts.

The practice of the invention has been illustrated by some specific examples which are not intended to limit the scope of the invention.

The invention claimed is:

1. A method of making a plurality of dimensionally accurate carbon fiber reinforced, thermosetting polymer matrix articles, the method comprising:
   compressing a composite body comprising a three-dimensional carbon fiber reinforcing form that is infiltrated with a liquid thermosetting polymer precursor against a surface of a mold, the mold comprising a unitary body of iron-nickel alloy, the mold body having been fabricated from a slab of iron-nickel alloy and with a machined oversized cavity surface for receiving, shaping and thermal curing of the fiber reinforcing form and uncured polymer composite material, the cavity surface of the mold body having a coating layer of electroless nickel composition comprising up to 10 percent phosphorus by weight applied to the machined oversize cavity surface in a thickness of between about 60 micrometers and 90 micrometers for a predetermined size of the cavity surface and for contact by the composite material; and heating the composite body while it is compressed against the cavity surface to cure the polymer precursor into a solid polymeric matrix for the carbon fiber article, the mold body and coating experiencing repeated heating and cooling cycles during the making of the plurality of dimensionally accurate articles without delamination.

2. A method of making a plurality of carbon fiber reinforced, thermosetting polymer matrix articles as recited in claim 1 in which the iron-nickel alloy consists essentially, by weight of about 36% nickel and the balance iron.

3. A method of making a plurality of dimensionally accurate carbon fiber reinforced, thermosetting polymer matrix articles, the method comprising:

compressing a composite body comprising at least one layer of a carbon fiber cloth, the cloth having a carbon fiber orientation, as a reinforcing form that is infiltrated with a liquid thermosetting polymer precursor against a surface of a mold, the mold comprising a unitary body of iron-nickel alloy, the mold body having been fabricated from a slab of iron-nickel alloy and with a machined oversized cavity surface for receiving, shaping and thermal curing of fiber and uncured polymer composite material, the cavity surface of the mold body having a coating layer of electroless nickel composition comprising up to 10 percent phosphorus by weight applied in a thickness of between about 60 micrometers and 90 micrometers for a predetermined size of the cavity surface and for contact by the composite material; and heating the composite body while it is compressed against the cavity surface to cure the polymer precursor into a solid polymeric matrix for the carbon fiber article, the mold body and coating experiencing repeated heating and cooling cycles during the making of the plurality of dimensionally accurate articles without delamination.

4. A method of making a plurality of carbon fiber reinforced, thermosetting polymer matrix articles as recited in claim 3 in which the iron-nickel alloy consists essentially, by weight of about 36% nickel and the balance iron.

5. A method of making a plurality of carbon fiber reinforced, thermosetting polymer matrix articles as recited in claim 3 in which the carbon fiber cloth is woven.

6. A method of making a plurality of carbon fiber reinforced, thermosetting polymer matrix articles as recited in claim 3 in which successive carbon fiber cloth layers are laid up with their carbon fibers oriented in different directions.

7. A method of making a plurality of carbon fiber reinforced, thermosetting polymer matrix articles as recited in claim 3 in which the molded articles exhibit substantially isotropic properties.

8. A method of making a plurality of dimensionally accurate carbon fiber reinforced, thermosetting polymer matrix articles, the method comprising:

compressing a composite body comprising a three-dimensional carbon fiber reinforcing form that is infiltrated with a liquid thermosetting polymer precursor against a surface of a mold, the mold comprising a unitary iron-nickel alloy body consisting essentially by weight of about 36 percent nickel and the balance iron, the mold body having been fabricated from a slab of iron-nickel alloy and with a machined, polished and, optionally, textured, oversized cavity surface for receiving, shaping and thermal curing of the fiber reinforcing form and uncured polymer composite material, the cavity surface of the mold body having a coating layer of electroless nickel composition comprising up to 10 percent phosphorus by weight applied to the oversize cavity surface in a thickness of between about 60 micrometers and 90 micrometers for a predetermined size of the cavity surface and for contact by the composite material; and heating the composite body while it is compressed against the cavity surface to cure the polymer precursor into a solid polymeric matrix for the carbon fiber article, the mold body and coating experiencing repeated heating and cooling cycles during the making of the plurality of dimensionally accurate articles without delamination.

9. The method of making a plurality of carbon fiber reinforced, thermosetting polymer matrix articles as recited in claim 8 in which the surface is polished to 400 grit.

10. The method of making a plurality of carbon fiber reinforced, thermosetting polymer matrix articles as recited in claim 8 in which the surface is polished to 600 grit and textured by blasting with a mixture of aluminum oxide and glass beads.

* * * * *